US012759050B2

(12) United States Patent
Bondestam Malmberg et al.

(10) Patent No.: US 12,759,050 B2
(45) Date of Patent: Oct. 13, 2026

(54) ADDITIVE MANUFACTURING PROCESS

(71) Applicant: General Electric Company, Schenectady, NY (US)

(72) Inventors: John Bondestam Malmberg, Gothenburg (SE); Mattias Fager, Gothenburg (SE)

(73) Assignee: GENERAL ELECTRIC COMPANY, Evendale, OH (US)

( * ) Notice: Subject to any disclaimer, the term of this patent is extended or adjusted under 35 U.S.C. 154(b) by 532 days.

(21) Appl. No.: 18/485,810

(22) Filed: Oct. 12, 2023

(65) Prior Publication Data

US 2025/0121436 A1 Apr. 17, 2025

(51) Int. Cl.
*B22F 10/366* (2021.01)
*B22F 10/28* (2021.01)
(Continued)

(52) U.S. Cl.
CPC ............ *B22F 10/366* (2021.01); *B22F 10/28* (2021.01); *B22F 12/222* (2021.01); *B33Y 10/00* (2014.12); *B33Y 50/02* (2014.12)

(58) Field of Classification Search
CPC ...... B22F 10/366; B22F 10/28; B22F 12/222; B22F 2203/11; B22F 10/36; B22F 10/362; B22F 10/368; B22F 12/30; B33Y 10/00; B33Y 50/02; Y02P 10/25; B29C 64/153; B29C 64/282
See application file for complete search history.

(56) References Cited

U.S. PATENT DOCUMENTS 8,187,521 B2 5/2012 Larsson et al.
9,773,586 B2 9/2017 Karlen et al.
(Continued)

FOREIGN PATENT DOCUMENTS

CN 111790908 A 10/2020
EP 2862652 A1 4/2015
(Continued)

OTHER PUBLICATIONS

Rizza et al., "A phase field study of neck growth in electron beam powder bed fusion (EB PBF) process of Ti6Al4V powders under different processing conditions," The International Journal of Advanced Manufacturing Technology (2022).
(Continued)

*Primary Examiner* — Ricardo D Morales
(74) *Attorney, Agent, or Firm* — Dinsmore & Shohl LLP

(57) ABSTRACT

A method of forming a build platform for a powder bed fusion additive manufacturing process. The method incudes directing a high-energy beam at a first energy level to irradiate a bed of fusible powder and to form a first layer of the build platform. The method also includes forming subsequent initial layers of the build platform, each subsequent layer being formed by directing the high-energy beam to irradiate a distributed layer of the fusible powder to form one of the subsequent initial layers of the build platform. The energy level of the high-energy beam is increased from the first energy level for successive layers of the subsequent initial layers. The build platform may be a sintered build platform where the degree of sintering increases from the bottom layer toward the top layer.

20 Claims, 6 Drawing Sheets

(51) Int. Cl.

| | |
|---|---|
| ***B22F 12/00*** | (2021.01) |
| ***B33Y 10/00*** | (2015.01) |
| ***B33Y 50/02*** | (2015.01) |

(56) References Cited

U.S. PATENT DOCUMENTS

| | | | | |
|---|---|---|---|---|
| 10,259,045 | B2 | 4/2019 | Karlen et al. | |
| 10,744,562 | B2 | 8/2020 | Frontera et al. | |
| 11,065,813 | B2 | 7/2021 | Hofmann et al. | |
| 11,117,195 | B2 | 9/2021 | Sutcliffe et al. | |
| 11,117,317 | B2 | 9/2021 | Tomita | |
| 11,141,809 | B2 | 10/2021 | Nelson et al. | |
| 11,485,043 | B2 | 11/2022 | Lin et al. | |
| 2017/0348792 | A1 | 12/2017 | Fager | |
| 2018/0169757 | A1 | 6/2018 | Murao | |
| 2020/0079028 | A1 * | 3/2020 | Miller | B22F 10/47 |
| 2020/0130057 | A1 | 4/2020 | Zhi et al. | |
| 2020/0254519 | A1 | 8/2020 | Jones et al. | |
| 2022/0134433 | A1 | 5/2022 | Mcfarland et al. | |

FOREIGN PATENT DOCUMENTS

| | | | |
|---|---|---|---|
| JP | 05261830 | A | 10/1993 |
| JP | 2019209558 | A | 12/2019 |
| JP | 2020121557 | A | 8/2020 |
| JP | 2020169372 | A | 10/2020 |
| WO | 2022184758 | A1 | 9/2022 |

OTHER PUBLICATIONS

Extended European Search Report for Application No. 24205903.8 dated Mar. 11, 2025 (9 pages).

Japanese Office Action for Application No. 2024-179257 issued Oct. 21, 2025 (6 pages with English Translation).

* cited by examiner

ADDITIVE MANUFACTURING PROCESS

TECHNICAL FIELD

The present disclosure relates additive manufacturing, particularly, powder bed fusion additive manufacturing processes.

BACKGROUND

Additive manufacturing, sometimes also referred to as 3D printing, is a process of creating an object (three-dimensional object) by building the object one layer at a time. Powder bed fusion (PBF) is one type of additive manufacturing methods (3D printing methods). Generally, powder bed fusion works by applying an energy source, such as a laser beam or an electron beam, to fuse together powdered material on a build plate. A recoater spreads a thin layer of powder across a build surface (the powder bed), the energy source selectively melts the material needed for that layer, and then the build plate descends to make way for the next layer.

BRIEF DESCRIPTION OF THE DRAWINGS

Features and advantages of the present disclosure will be apparent from the following description of various exemplary aspects, as illustrated in the accompanying drawings, wherein like reference numbers generally indicate identical, functionally similar, and/or structurally similar elements.

FIG. 6A shows a first energy control approach, and FIG. 6B shows a second energy control approach.

DETAILED DESCRIPTION

Features, advantages, and aspects of the present disclosure are set forth or apparent from a consideration of the following detailed description, drawings, and claims. Moreover, the following detailed description is exemplary and intended to provide further explanation without limiting the scope of the disclosure as claimed.

Various aspects are discussed in detail below. While specific aspects are discussed, this is done for illustration purposes only. A person skilled in the relevant art will recognize that other components and configurations may be used without departing from the spirit and the scope of the present disclosure.

The terms "coupled," "fixed," "attached," "connected," and the like, refer to both direct coupling, fixing, attaching, or connecting, as well as, indirect coupling, fixing, attaching, or connecting through one or more intermediate components or features, unless otherwise specified herein.

The singular forms "a," "an," and "the" include plural references unless the context clearly dictates otherwise.

Here and throughout the specification and claims, range limitations are combined and interchanged. Such ranges are identified and include all the sub-ranges contained therein, unless context or language indicates otherwise. For example, all ranges disclosed herein are inclusive of the endpoints, and the endpoints are independently combinable with each other.

Figure 1:
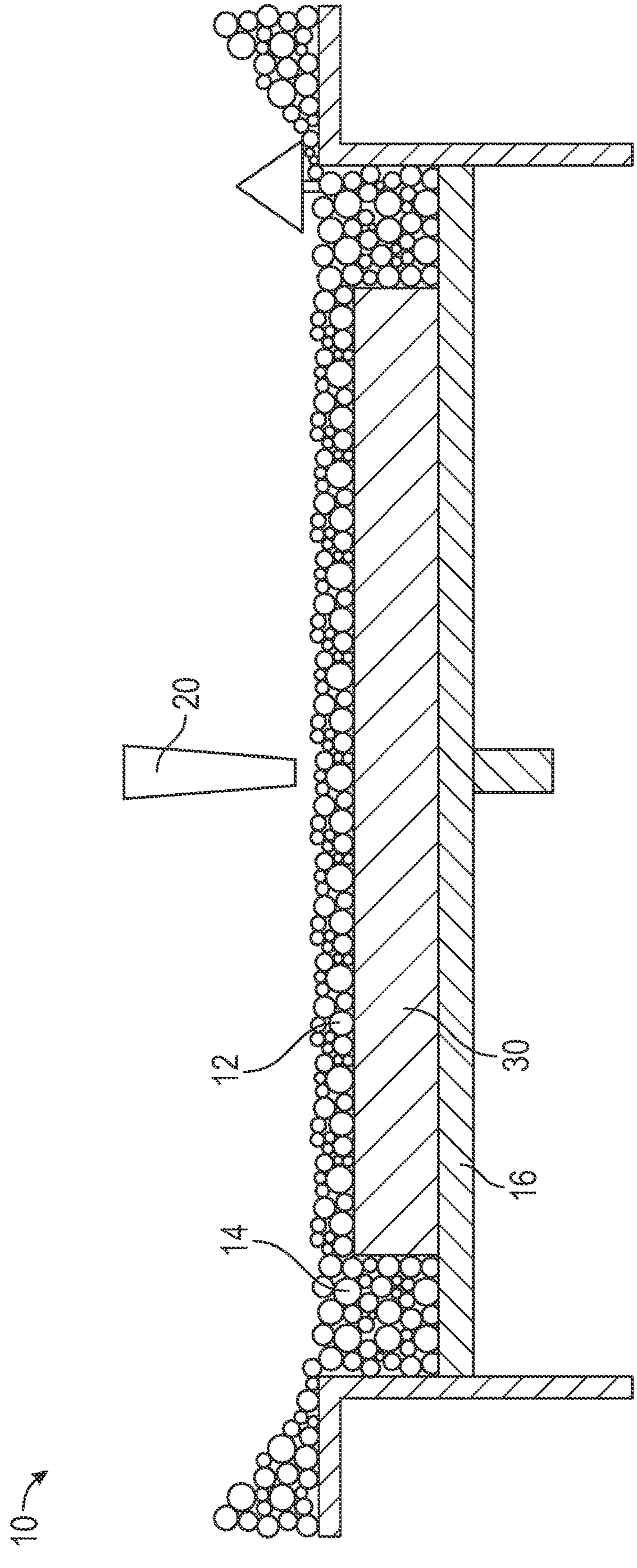
FIG. 1 (Prior Art)
FIG. 1 illustrates a conventional configuration of a build tank for starting a powder bed fusion additive manufacturing process.

FIG. 1 is a schematic cross-sectional view of a portion of a build chamber of an electron beam melting (EBM) machine. FIG. 1 illustrates a conventional configuration of a build tank 10 for starting a powder bed fusion additive manufacturing process. As noted above, a high-energy beam 20, such as a laser beam or an electron beam, may be used in powder bed fusion additive manufacturing processes. The high-energy beam 20 selectively radiates a fusible powder 12 arranged in a powder bed 14 on top of a worktable 16. The high-energy beam 20 heats and then subsequently melts portions of the fusible powder 12 to form a layer of the part being built. The layer then to cools to solidify the melted particles. Powders, such as the fusible powder 12, typically have a relatively low thermal conductivity, and thus to efficiently cool the melted powder, the build is conventionally formed on top of a relatively thick start plate 30, having a higher thermal conductivity than that of the fusible powder 12 to dissipate the heat and to solidify the melted powder. Avoiding a buildup of charges in the powder bed 14 when the high-energy beam 20 is an electron beam is also desired. Powders, such as the fusible powder 12, also have a relatively low electrical conductivity, and the start plate 30, having a higher electrical conductivity than that of the fusible powder 12, can also effectively conduct the electrons away from the from the powder bed 14 to avoid charge buildup.

Using the start plate 30 poses challenges that increases the build time of parts being manufactured using such powder bed fusion additive manufacturing processes. For example, the start plate 30 must be placed in the build tank 10 and then the start plate 30 must undergo time-consuming leveling process before the build can begin. Once the build is complete, the part may have been effectively welded to the start plate 30 and machining processes may be required to separate the part from the start plate 30. The processes discussed herein enable the powder bed fusion additive manufacturing process to begin on a powder bed without the use of the start plate 30.

Figure 2:
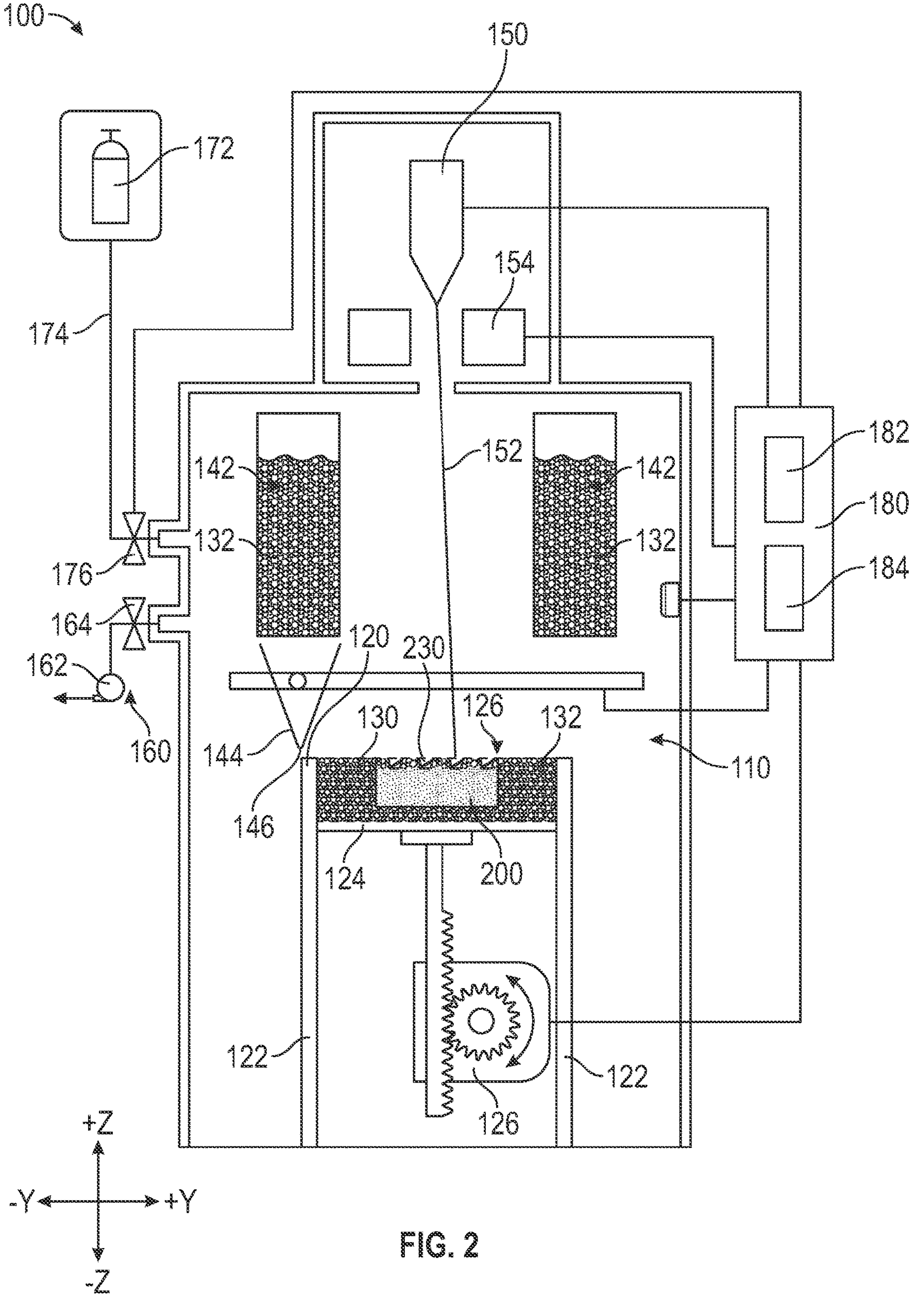
FIG. 2 is a schematic view of a powder bed fusion additive manufacturing machine.

FIG. 2 is a schematic view of a powder bed fusion additive manufacturing machine 100 that may be used to implement the methods discussed herein. More specifically, the powder bed fusion additive manufacturing machine 100 discussed herein is an electron beam melting (EBM) machine. The methods and manufactured items discussed herein will be made with reference to an EBM additive manufacturing process, but these methods and the items produced therefrom may also be applied to other powder bed fusion additive manufacturing processes, such as, direct metal laser sintering (DMLS), selective heat sintering (SHS), selective laser melting (SLM), and selective laser sintering (SLS).

The powder bed fusion additive manufacturing machine 100 includes a build chamber 110. Located within the build chamber 110 is a build tank 120. The build tank 120 includes sidewalls 122 and a worktable 124. The worktable 124 is movable in a Z direction (up and down) by a suitable movement mechanism 126, such as a motor or an actuator. During a build (process of manufacturing a part) the worktable 124 will be lowered successively in relation to a fixed point in the build chamber 110.

A bed of a fusible powder 132, referred to herein as a powder bed 130, is formed on the worktable 124 within the build tank 120. Suitable fusible powder 132 that may be used with the methods discussed herein include various thermoplastic polymers and metals. In preferred embodiments, the fusible powder 132 is a fusible metal powder formed of metal particulates of various metals and metal alloys. Such metals and metal alloys include, for example: titanium; titanium alloys; aluminum; aluminum alloys; stainless steel alloys; cobalt-chromium alloys; nickel-based alloys, including nickel-based super-alloys; copper; copper alloys; beryllium; beryllium alloys; tungsten; tungsten alloys; iron; iron alloys, including iron aluminide; or high entropy alloys with various bases.

The fusible powder 132 may be stored within powder hoppers 142 (feedstock reservoir) located within the build chamber 110 on opposing sides of the build tank 120. A recoater 144 is positioned to receive or to collect the fusible powder 132 from the powder hoppers 142 and move between the powder hoppers 134 over the build tank 120. Although the powder hoppers 142 are illustrated as being separate from the recoater 144, alternatively, one or more powder hoppers 142 may be integrally formed with the recoater 144 and moved with the recoater 144. The recoater 144 distributes a layer of the fusible powder 132 on top of the worktable 124 as it moves from one side of the build tank 120 to the other. The recoater 144 may also include a leveler 146, such as a leveling roller or a leveling blade that levels the fusible powder 132 on the powder bed 130 as the recoater 144 is moved across the powder bed 130 and worktable 124. Any suitable movement mechanism may be used to move the recoater 144 in the manner discussed above. For example, the recoater 144 may be movably connected to a rail, and a motor moves the recoater 144 in one of an X direction or a Y direction. Movement in the Y direction is illustrated in FIG. 2, and an X direction is perpendicular to both the Y direction and the Z direction.

The powder bed fusion additive manufacturing machine 100 includes a high-energy beam source 150 generating a high-energy beam 152. In this embodiment, the high-energy beam source 150 is an electron beam gun, and the high-energy beam 152 is an electron beam. The electron beam gun (high-energy beam source 150) may generate a focusable electron beam with an accelerating voltage from, for example, sixty kilovolts (60 kV) to one hundred twenty kilovolts (120 kV). The high-energy beam source 150, generating the high-energy beam 152, is positioned above the build tank 120, and, as will be discussed further below, the high-energy beam 152 is directed to irradiate a distributed layer of the fusible powder 132 in a control pattern. Various coils, such as one focusing coil (not shown), at least one deflection coil 154, and a coil for astigmatic correction (not shown), may be used to control and to direct the electron beam (high-energy beam 152). As noted above, the high-energy beam 152 may be other suitable high-energy beams, such as a laser beam. When the high-energy beam 152 is a laser beam, the high-energy beam source 150 may be a laser and the beam may be directed by various suitable means including, for example, movable mirrors. As will be discussed in more detail below, the high-energy beam 152 is directed to irradiate a distributed layer of the fusible powder 132 to form a sintered build platform 200 and one or more parts 230 formed thereon.

The environment within the build chamber 110 may be controlled. When an electron beam is used as the high-energy beam 152, the build chamber 110 may be a vacuum chamber capable of maintaining a vacuum environment by means of a vacuum system 160. Various suitable vacuum systems 160 may be used and the vacuum system 160 may include a vacuum pump 162, such as a turbo-molecular pump, a scroll pump, or an ion pump, and one or more valves 164. Additionally or alternatively, an external gas supply (gas source 172) may be provided by one or more gas bottles fluidly connected to the build chamber 110 by a gas line 174 and a valve 176. When the valve 176 is open, gas from the gas bottle (gas source 172) will be provided to the build chamber 110. The valve 176 may be a flow control valve that can be set to any position between a fully open and a fully closed to regulate the flow of gas into the build chamber 110. The gas in the gas source 172 may be used for controlling the environment in which the fusible powder 132 is melted or loading the fusible powder 132 (or the finished three-dimensional article) with a predefined amount of gas.

The powder bed fusion additive manufacturing machine 100 also includes a controller 180. The controller 180 is configured to operate various aspects of the powder bed fusion additive manufacturing machine 100 including, for example, the high-energy beam 152 by being electrically and operatively coupled to the high-energy beam source 150 and the various beam control devices, such as the coils (e.g., deflection coil 154) used to control the electron beam. The controller 180 is also communicatively and operatively coupled to various motors and actuators discussed herein to control the build process. For example, the controller 180 may be communicatively and operatively coupled to the movement mechanism 126 of the worktable 124 and the recoater 144. In this embodiment, the controller 180 is a computing device having one or more processors 182 and one or more memories 184. The processor 182 can be any suitable processing device, including, but not limited to, a microprocessor, a microcontroller, an integrated circuit, a logic device, a programmable logic controller (PLC), an application-specific integrated circuit (ASIC), and/or a Field Programmable Gate Array (FPGA). The memory 184 can include one or more computer-readable media, including, but not limited to, non-transitory computer-readable media, a computer-readable non-volatile medium (e.g., a flash memory), a RAM, a ROM, hard drives, flash drives, and/or other memory devices.

The memory 184 can store information accessible by the processor 182, including computer-readable instructions that can be executed by the processor 182. The instructions can be any set of instructions or a sequence of instructions that, when executed by the processor 182, cause the processor 182 and the controller 180 to perform operations. In some embodiments, the instructions can be executed by the processor 182 to cause the processor 182 to complete any of the operations and functions for which the controller 180 is configured, as will be described further below. The instructions can be software written in any suitable programming language, or can be implemented in hardware. Additionally, and/or alternatively, the instructions can be executed in logically and/or virtually separate threads on the processor 182. The memory 184 can further store data that can be accessed by the processor 182.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between components and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 3:
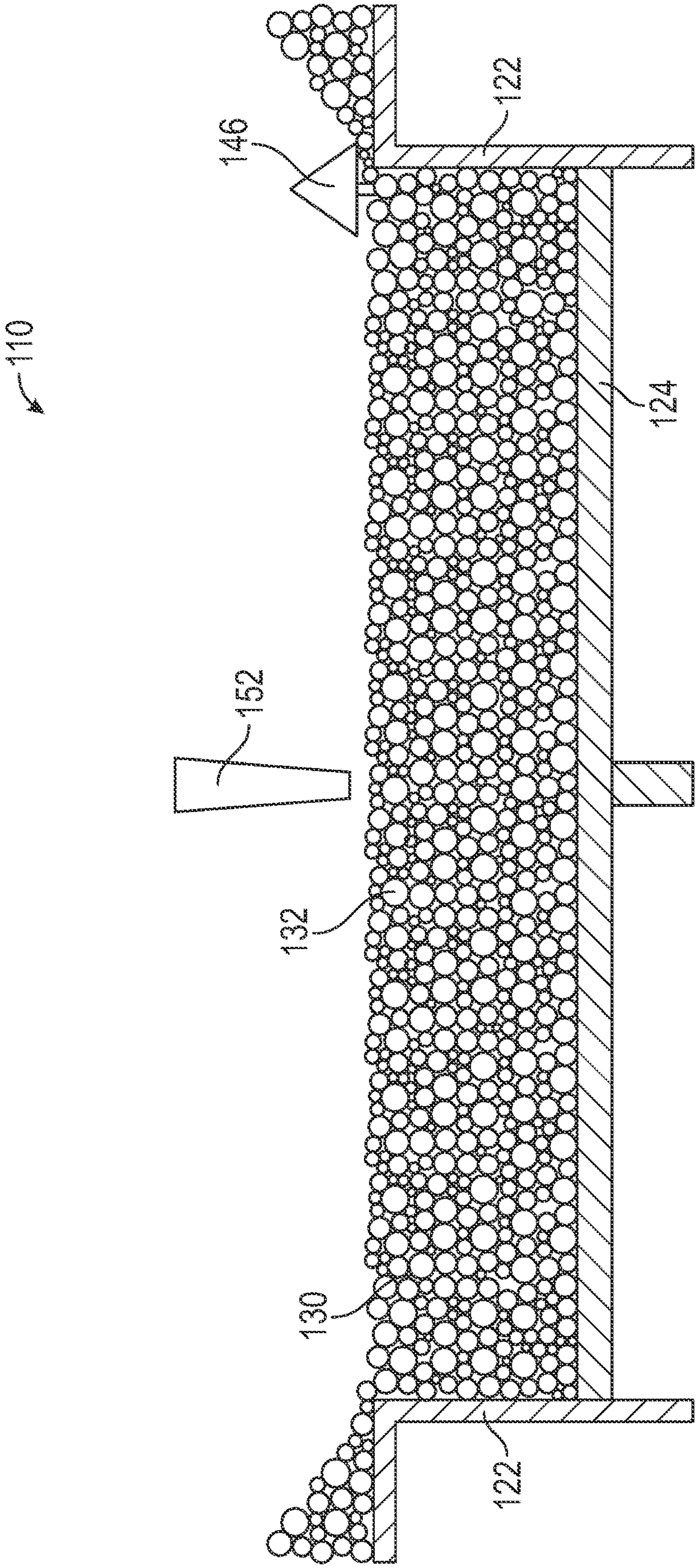
FIG. 3 is a schematic cross-sectional view of a portion of a build chamber of the powder bed fusion additive manufacturing machine shown in FIG. 2 for starting a powder bed fusion additive manufacturing process.

FIG. 3 is a schematic cross-sectional view of a portion of the build chamber 110 of the powder bed fusion additive manufacturing machine 100. FIG. 3 illustrates a configuration of the build tank 120 for starting a powder bed fusion additive manufacturing process. The worktable 124 is positioned such that the leveler 146 of the recoater 144 (see FIG. 2) can distribute the fusible powder 132 on the worktable 124 within the build tank 120 to form the powder bed 130. FIG. 3 thus illustrates an initial step in the methods discussed herein, more specifically, providing a bed (powder bed 130) of fusible powder 132 on the worktable 124 within the build chamber 110 and the build tank 120. As compared to the conventional process, shown in FIG. 1, this step does not include providing a starting build plate (e.g., start plate 30 shown in FIG. 1). Instead, the following method is used to form the build platform within the powder bed fusion additive manufacturing machine 100 by the additive manufacturing process conducted by the powder bed fusion additive manufacturing machine 100. This build platform will be referred to herein as a sintered build platform 200.

Figure 4:
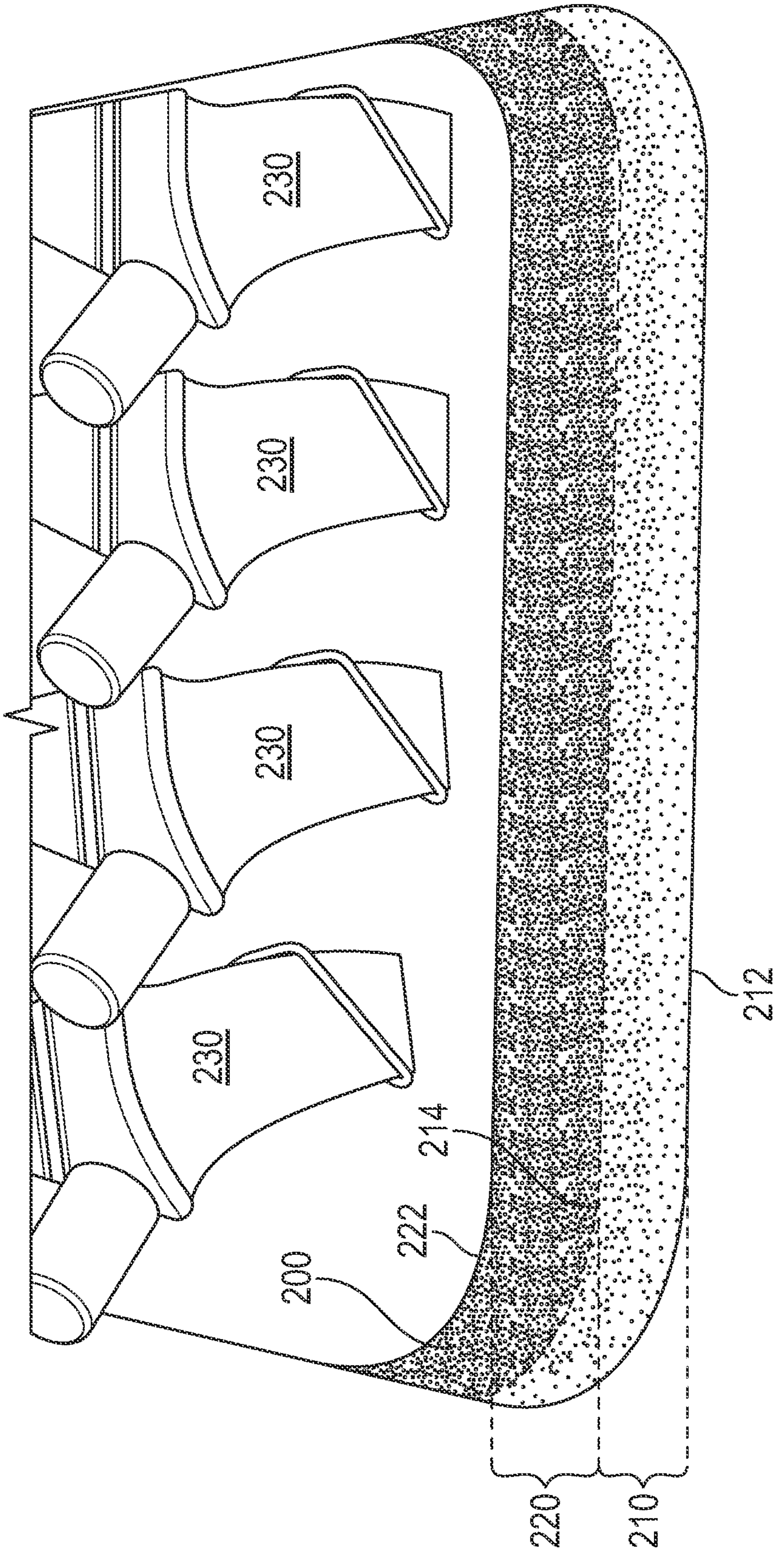
FIG. 4 shows a sintered build platform having parts formed thereon at the completion of a build using the powder bed fusion additive manufacturing process.

FIG. 4 shows the sintered build platform 200, having parts 230 formed thereon, at the completion of a build. The sintered build platform 200 is formed from a plurality of layers and, in this embodiment, includes a plurality of layers that are referred to as initial layers 210. The initial layers 210 include a first initial layer 212. The first initial layer 212 may also be referred to herein as a bottom layer of the sintered build platform 200. The first initial layer 212 is formed by directing the high-energy beam 152 in a first control pattern to irradiate the powder bed 130. The high-energy beam 152 may be controlled to various different patterns and control sequences. The patterns for controlling the high-energy beam 152 may be stored in the controller 180, more specifically, the memory 184, and/or generated by the controller 180. The controller then controls the high-energy beam 152, such as by controlling the deflection coil 154 when the high-energy beam 152 is an electron beam, according to these instructions.

Figure 5:
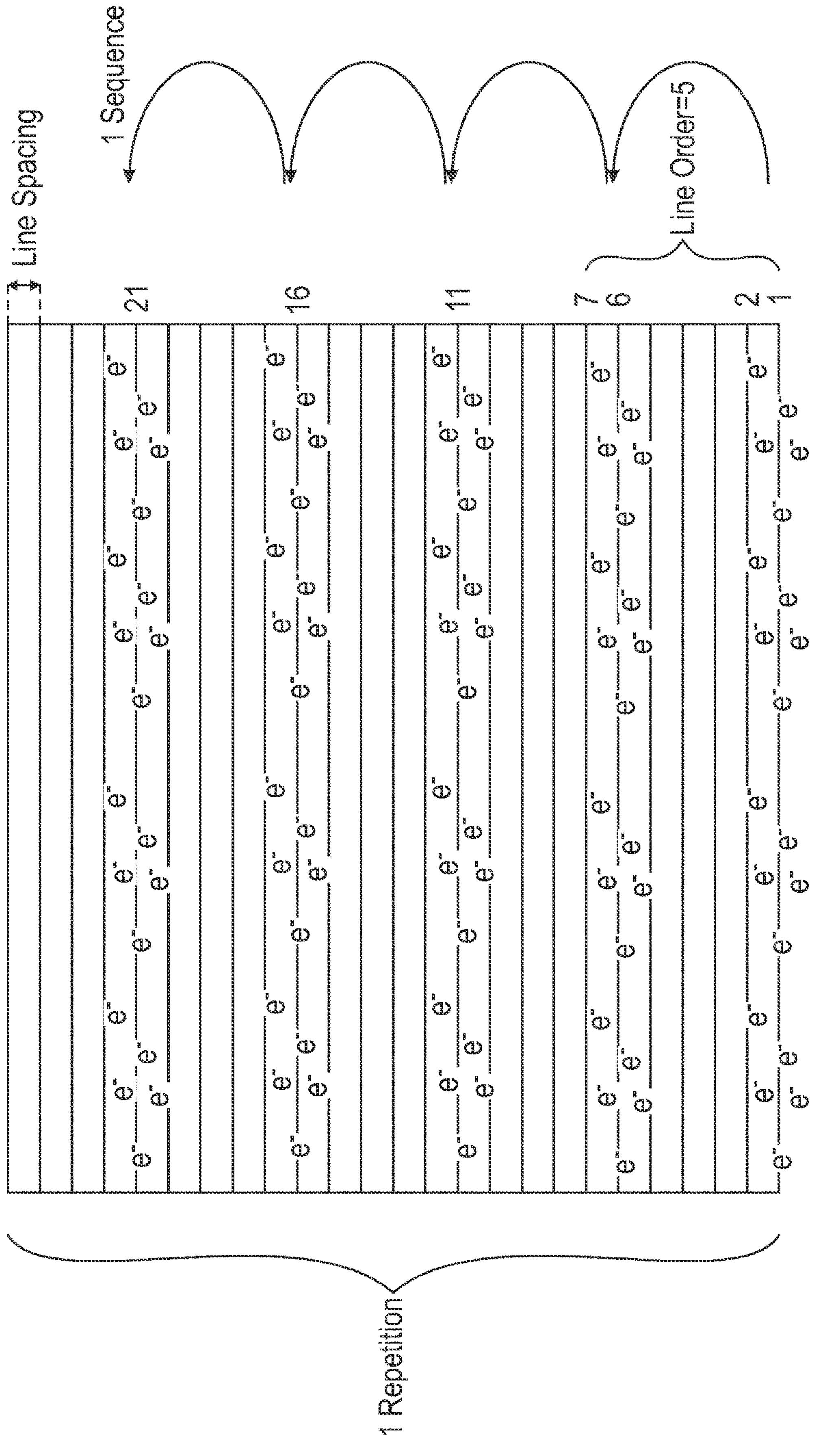
FIG. 5 shows a control pattern that may be used for a high-energy beam used in the powder bed fusion additive manufacturing process.

FIG. 5 shows a control pattern that may be used to irradiate a scanning region of the powder bed 130. The scanning region is the region of the powder bed 130 scanned by the high-energy beam 152, such as the region scanned for one layer of the sintered build platform 200. In some embodiments, the high-energy beam 152 is irradiated in the control pattern over the scanning region a plurality of times (i.e., repeated one or more times, which is referred to herein as a repetition) to complete one layer of the sintered build platform 200. The high-energy beam 152 is scanned along a plurality of scan lines at a scanning speed. In this embodiment, each scan line is straight, and the plurality of scan lines are parallel to each other. Each of the scan lines is separated from an adjacent scan line by a predefined line spacing. In this embodiment, the scan lines are distributed evenly with a constant line spacing between adjacent scan lines, such that the predefined line spacing is the same between each scan line. For reference, the scan lines are sequentially numbered in the control pattern, starting with a first scan line (1). The scan line adjacent to the first scan line (1) is a second scan line (2) and the remaining scan lines are consecutively numbered accordingly.

In this embodiment, the high-energy beam 152 does not irradiate adjacent scan lines consecutively. Instead, a different line order, such as an interlaced pattern, is used. Once the high-energy beam 152 is scanned along the first scan line (1), several scan lines are skipped, and the next scan line irradiated by the high-energy beam 152 is spaced apart by several scan lines (a line order). For example, with a line order of five (5) and a total of twenty-five scan lines in the control pattern, the high-energy beam 152 irradiates the following lines in the first sequence: the first scan line (1), the sixth scan line (6), the eleventh scan line (11), the sixteenth scan line (16), and the twenty-first scan line (21). After the first sequence is completed, the high-energy beam 152 irradiates scan lines of a second sequence in a similar manner, starting with the second scan line (2). In this example, the high-energy beam 152 irradiates the following lines in the second sequence: the second scan line (2), the seventh scan line (7), the twelfth scan line (12), the seventeenth scan line (17), and the twenty-second scan line (22). The high-energy beam 152 irradiates additional scan lines for additional sequences until all of the scan lines in the control pattern have been scanned.

The high-energy beam 152 is operated at an energy level to impart energy from the high-energy beam 152 to the particles of the fusible powder 132 and to heat the particles of the fusible powder 132 as the high-energy beam 152 is scanned along the scan lines, in the manner discussed above. In forming the first initial layer 212, the high-energy beam 152 is operated at an initial energy level ($E_I$) (also referred to herein as a first energy level). As discussed above, the fusible powder 132 of the powder bed 130 has a relatively low thermal conductivity and a relatively low electrical conductivity. Without the start plate 30, heat and electricity (when the high-energy beam 152 is an electron beam) can build if a relatively high amount of energy or relatively high energy intensity is input in forming the first initial layer 212. To avoid this buildup of heat and electricity, the initial energy level ($E_I$) is low compared to the energy level used to form an initial layer of a part in a conventional environment having a build plate. The initial energy level ($E_I$) may be material dependent, and as discussed further below, controlled in a number of different ways. Example ranges for the initial energy level ($E_I$) are provided below. More specifically, the initial energy level ($E_I$) may be set to input energy into the particles of the fusible powder 132 at a point where cohesion between the particles begins in a time scale that is comparable to the time taken to scan the layer. (e.g., times less than three minutes). Cohesion may also be the point at which the energy input results in a change in the electrical properties or thermodynamic properties of the powder bed 130. Although cohesion may include other forces, this level of cohesion may include adjacent particles of the fusible powder 132 beginning to sinter together, having a relatively small amount of necking between particles.

As discussed in more detail below, the energy level of the high-energy beam 152 is controlled to form the sintered build platform 200 and one or more of the following parameters may be used to control the energy level. These parameters may be controlled individually or in combination with each other. The following discussion identifies the impact of a particular parameter on the energy level this impact is described in the context of the other parameters remaining the same to emphasize the effect of the particular parameter being discussed, but controlling the energy level is not limited to only changing one parameter at a time. Instead, in some embodiments, the energy level of the high-energy beam 152 may be changed, such as increased, in the manner discussed further below by changing a plurality of the parameters discussed below to result in an overall change, such as an overall increase, in the energy level of the high-energy beam 152.

The high-energy beam 152 may be operated over the scanning region at a beam power. The energy level of the high-energy beam 152 may be controlled by controlling the beam power. For example, increasing the beam power increases the energy level, and decreasing the beam power decreases the energy level. When the high-energy beam 152 is an electron beam, the energy level of the high-energy beam is controlled (e.g., increased) by controlling (increasing) the current of the electron beam. In some embodiments, the energy level of the high-energy beam 152 for the initial energy level ($E_I$) may be from $3.84\times10^2$ W to $5.76\times10^2$ W.

The high-energy beam 152 is scanned along each scan line at a scan speed. Preferably, the scan speed is constant for each scan line, and the energy level of the high-energy beam 152 may be controlled by controlling the scan speed in conjunction with the beam power. For a constant beam power, increasing the scan speed will decrease the intensity of energy imparted to the fusible powder 132, and decreasing the scan speed will increase the intensity of energy imparted to the fusible powder 132. Relatedly, the energy level of the high-energy beam 152 may also be controlled by controlling a line energy of the high-energy beam 152. The line energy of the high-energy beam 152 is based on the beam power and the scan speed. The line energy may be increased by increasing the beam power, decreasing the scan speed, or both. Conversely, the line energy may be decreased by decreasing the beam power, increasing the scan speed, or both. In some embodiments, the scan speed for the initial energy level (Ex) may be from 53 m/s to 80 m/s, and the line energy of the high-energy beam 152 for the initial energy level (Ex) may be from 5.83 J/m to 8.60 J/m.

The high-energy beam 152 has a spot diameter (or spot size). The spot diameter measures the size of the region of the fusible powder 132 that is irradiated by the high-energy beam 152 at a given instant. The spot diameter can be defined as the greatest distance between two points of the surface of the fusible powder 132 that receives radiation from the high-energy beam 152 at a given instance. Alternatively, the spot diameter can be defined as the largest distance between two points of the surface of the fusible powder 132 that receives at least a predetermined fraction of the total intensity imparted by the high-energy beam 152 at a given instance. For a constant beam power, increasing the spot diameter will decrease the intensity of energy imparted to the fusible powder 132, and decreasing the spot diameter will increase the intensity of energy imparted to the fusible powder 132. Relatedly, the energy level of the high-energy beam 152 may also be controlled by controlling a local heat flux of the high-energy beam 152. The local heat flux of the high-energy beam 152 is based on the spot diameter and the scan speed. The local heat flux may be increased by increasing the beam power, decreasing the spot diameter, or both. Conversely, the local heat flux may be decreased by decreasing the beam power, increasing the spot diameter, or both. In some embodiments, the spot diameter of the high-energy beam 152 for the initial energy level ($E_I$) may be from $3.88\times10^{-4}$ m to $5.82\times10^{-4}$ m, and the local heat flux for the initial energy level ($E_I$) may be from $2.08\times10^9$ W/m$^2$ to $3.12\times10^9$ W/m$^2$.

As noted above, the high-energy beam 152 may be operated over the scanning region at a beam power. This scanning region may also have an area or size, referred to herein as a scanning area. The scanning area may be the area scanned in one repetition. The energy level of the high-energy beam 152 may also be controlled by controlling the scanning area in conjunction with the beam power. For a constant beam power, increasing the scanning area will decrease the intensity of energy imparted to the fusible powder 132, and decreasing the scanning area will increase the intensity of energy imparted to the fusible powder 132. Relatedly, the energy level of the high-energy beam 152 may also be controlled by controlling a global heat flux of the high-energy beam 152. The global heat flux of the high-energy beam 152 is based on the scanning area and the scan speed. The global heat flux may be increased by increasing the beam power, decreasing the scanning area, or both. Conversely, the global heat flux may be decreased by decreasing the beam power, increasing the scanning area, or both. In some embodiments, the global heat flux for the initial energy level ($E_I$) may be from $8.72\times10^3$ W/m$^2$ to $1.31\times10^4$ W/m$^2$.

The energy level of the high-energy beam 152 may also be controlled by controlling a total amount of energy deposited on a given layer. The total amount of energy deposited may be based on, and thus controlled using, the parameters discussed above. As noted above, the high-energy beam 152 may be irradiated in the control pattern over the scanning region a plurality of times to complete one layer, which is referred to herein as a repetition. The total amount of energy deposited on a given layer may also be controlled by changing the number of repetitions. Increasing the number of repetitions increases the total amount of energy deposited on a given layer, and decreasing the number of repetitions decreases the total amount of energy deposited on a given layer. In some embodiments, the parameters discussed above are constant over a single repetition and may be the same for each repetition, but in other embodiment these parameters may different between repetitions. In some embodiments, the total energy for the first initial layer 212 may be from $3.37\times10^3$ J to $5.05\times10^3$ J.

After the first initial layer 212 is finished, the controller 180 lowers the worktable **124*a* predetermined distance, and the recoater 144 distributes a layer of the fusible powder 132 on top of the first initial layer 212 (the previous layer) and the worktable 124. Then, the high-energy beam 152 is directed, in a manner similar to that discussed above, to irradiate the distributed layer of the fusible powder 132 to form a second layer of the initial layers 210 of the sintered build platform 200. In forming the second layer of the initial layers 210, the high-energy beam 152 is directed to irradiate (scan) the distributed layer of the fusible powder 132 in a second control pattern. The second control pattern may be the same as the first control pattern discussed above. This process is then repeated for each subsequent layer of the initial layers 210 to an uppermost initial layer 214 of the initial layers 210**.

Figure 6A:
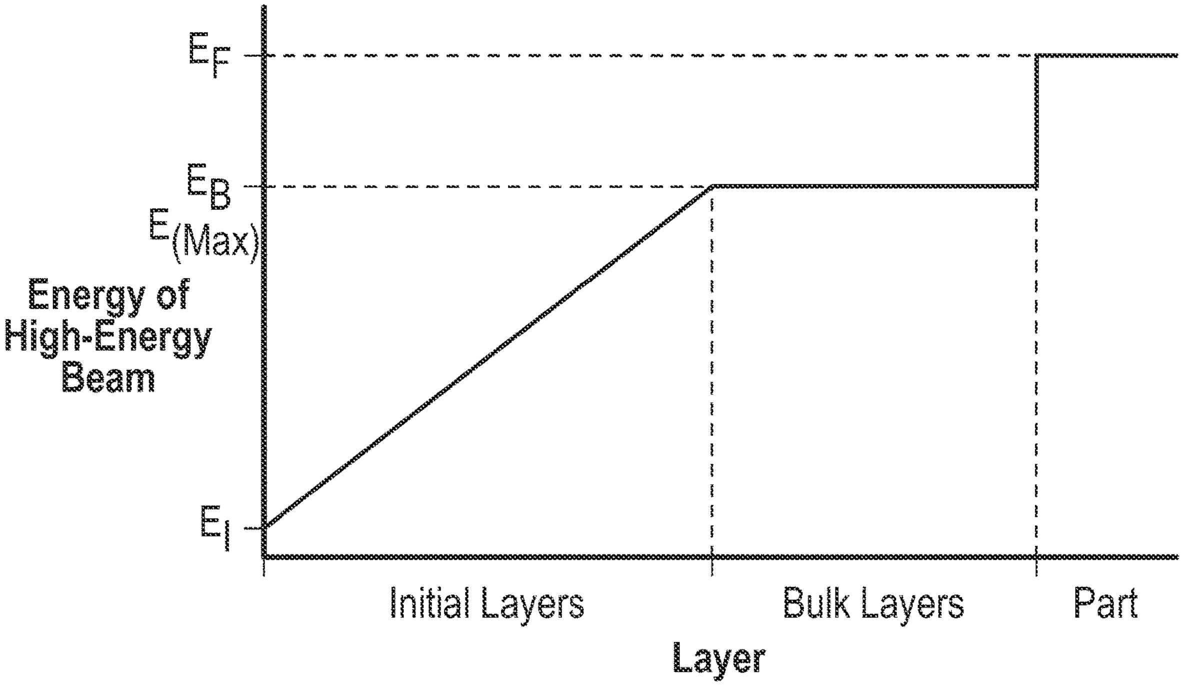
FIGS. 6A and 6B are graphs illustrating the energy level of the high-energy beam in forming the plurality of layers of the sintered build platform shown in FIG. 4.
Figure 6B:
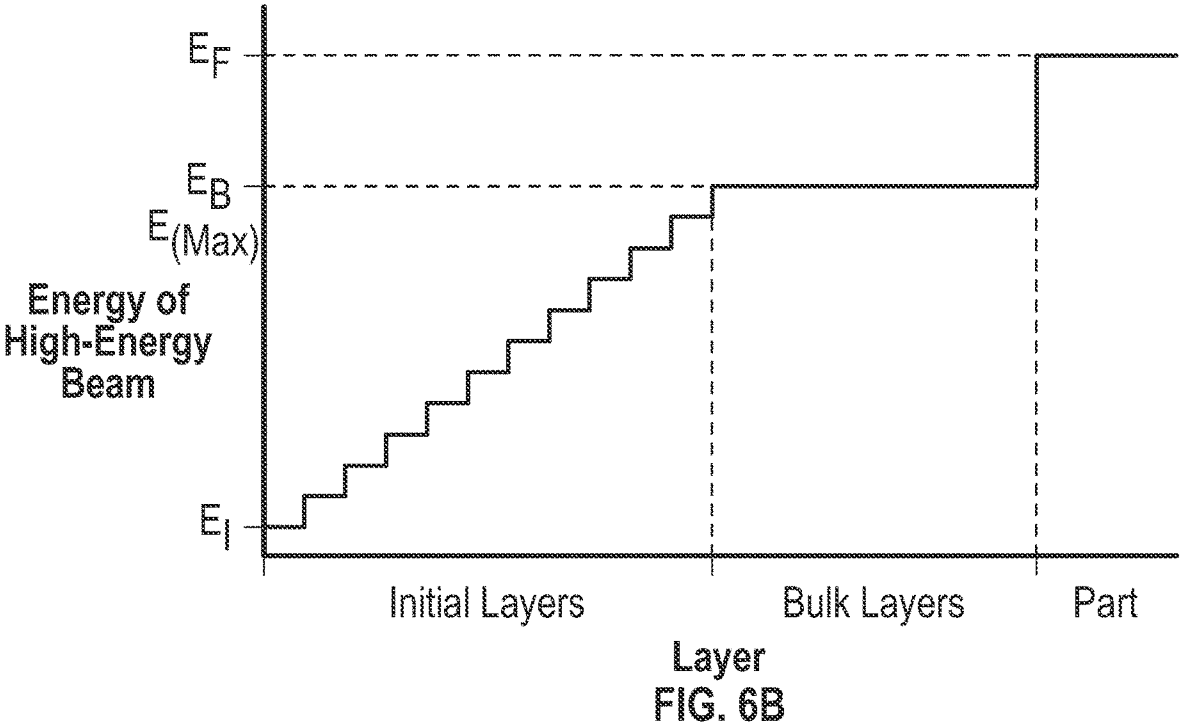

FIGS. 6A and 6B are graphs illustrating the energy level of the high-energy beam 152 in forming the plurality of layers of the sintered build platform 200. As discussed above, the first initial layer 212 is formed with the high-energy beam 152 operated at the initial energy level ($E_I$), but subsequent initial layers 210 are not formed at the initial energy level ($E_I$), as the amount of cohesion of the initial layer does not increase the thermal and the electrical conductivity to displace the energy required for melting and solidifying the fusible powder 132 during manufacturing of the part. A higher level of bonding between particles, such as the degree of sintering or degree of cohesion, is needed so that the sintered build platform 200 has sufficient thermal and electrical conductivity to form the part. In forming the subsequent initial layers 210, the energy level of the high-energy beam 152 is increased from the first energy level ($E_I$) for successive layers of the subsequent initial layers 210. The energy level of the high-energy beam 152 is increased to a maximum sintered build platform energy level ($E_{Max}$) and the high-energy beam 152 irradiates the distributed powder layer at the maximum sintered build platform energy level ($E_{Max}$) to form the uppermost initial layer 214.

FIG. 6A shows a first energy control approach to increase the energy level of the high-energy beam 152 from the first energy level ($E_I$) to the maximum sintered build platform energy level (EMax) for subsequent initial layers 210. In this approach, the energy level of the high-energy beam 152 is incrementally increased for each successive layer of the subsequent initial layers 210. In the approach shown in FIG. 6A, each subsequent initial layer 210 has a higher energy level than that of the preceding layer, and the energy level is increased progressively between levels to form a steady energy increase rate. The rate of energy level increase is preferably set to avoid so-called smoke formation, which may occur by the build up of electrical charges repulsing particles of the fusible powder 132 when the high-energy beam 152 is an electron beam. Additionally, the rate of energy level increase is preferably set to avoid the buildup of thermal gradients or stress gradients that may result in cracking, warping, or other dimensional changes of the sintered build platform 200. The thickness of each layer may be, for example, from thirty microns (30 μm) to one hundred fifty microns (150 μm). Preferably, the energy level is set to maintain the flatness of each layer at levels not to exceed the thickness of each layer.

In this embodiment, the energy level is increased linearly and, more specifically, rectilinearly, but the linear increase is not limited to a constant (or steady) energy increase rate, nor is the linear increase limited to rectilinearly increases and may include curvilinear increases.

FIG. 6B shows a second energy control approach to increase the energy level of the high-energy beam 152 from the first energy level ($E_I$) to the maximum sintered build platform energy ($E_{Max}$). In FIG. 6B, the energy level for successive layers of the initial layers 210 is increased in a stepwise manner with the initial layers 210 including a plurality of sets of subsequent initial layers. As used herein, a set is a plurality of adjacent layers that, in the depicted embodiment, are irradiated with the energy level of the high-energy beam 152 the same for each layer of the set. In this embodiment, the energy level of the high-energy beam 152 is incrementally increased for each successive set of the sets of subsequent initial layers 210. For example, the energy level may be increased progressively at a constant increase between each successive set of the sets of subsequent initial layers 210, but other approaches, such as the approach taken for the curvilinear increase in energy level may be taken for each successive set of the sets of subsequent initial layers 210.

In controlling the energy level of the high-energy beam 152 in the manner shown in FIGS. 6A and 6B, the fusible powder 132 is progressively sintered to form the initial layers 210. In forming the initial layers 210, the degree of cohesion and bonding, such as necking, between adjacent particles of the fusible powder 132 within the layer and between adjacent layers progressively increases from the first initial layer 212 to the uppermost initial layer 214.

Preferably, the build platform formed using the methods discussed herein is a sintered build platform 200 with the particles of the fusible powder 132 being sintered to one another. By maintaining the sintered build platform 200, including the initial layers 210 in a sintered condition, the sintered build platform 200 is easier to remove from the subsequently manufactured parts 230 (see FIG. 4). The fusible powder 132 has a melting temperature and, as will be discussed further below, the parts 230 may be manufactured by selectively heating the fusible powder 132 to a temperature greater than the melting temperature of the fusible powder 132 to melt the fusible powder 132 and, subsequently, to solidify the melted fusible powder 132 forming a layer of the parts 230. Accordingly, the maximum sintered build platform energy level ($E_{Max}$) may be an energy level that maintains the fusible powder 132 at a temperature less than the melting temperature of the fusible powder 132, such that the particles of the fusible powder 132 are sintered and not melted. If desired, however, solidification and forming of solid upper layers of the initial layers 210 may be used and thus the maximum sintered build platform energy level ($E_{Max}$) may be increased to energy levels used for forming the part 230. As will be discussed further below, the parts 230 may be formed, such as when the high-energy beam 152 is an electron beam, by at least one preheat scan and the maximum sintered build platform energy level ($E_{Max}$) may be the same energy level or a similar energy level to the energy level of the high-energy beam 152 used for the one of the preheat steps, such as the second preheat energy level when two preheat scans are used.

Referring back to FIG. 4, the sintered build platform 200 also may include additional layers beyond the initial layers 210. In this embodiment, the sintered build platform 200 includes a plurality of layers that are referred to as bulk layers 220. The bulk layers 220 are formed after the subsequent initial layers 210, and, in this embodiment, the uppermost initial layer 214 may also be the first layer of the bulk layers 220. The bulk layers 220 may be formed in the same manner as the subsequent initial layers 210, as discussed above. The bulk layers 220 add additional bulk or thickness to the sintered build platform 200. As discussed above, the degree of sintering of the fusible powder 132 is progressively increased in the initial layers 210 of the sintered build platform 200 to a point where sintered fusible powder 132 provides good thermal and electrical conductivity. The fusible powder 132 of the bulk layers 220 is preferably sintered at the same degree or a similar degree of sintering as the uppermost initial layer 214 to provide capacity for heat and charge transfer, as well as a stable surface on which to build the parts 230. The bulk layers 220 may also be used for thermal management when the part 230 is built. The bulk layers 220 may provide for energy storage or heat capacity and if the thermal mass of the sintered build platform 200 is too small, thermal management when forming the part 230 will be unstable, and thus the bulk layers 220 may be used to help maintain a stable build temperature for the part 230. In some embodiments, the total thickness of the bulk layers 220 may be thicker than the total thickness of the initial layers 210.

The energy level of the high-energy beam 152 for each of the bulk layers 220 in this embodiment is the same and is referred to herein as the bulk energy level ($E_B$). In the energy control approaches shown in FIGS. 6A and 6B, the bulk energy level ($E_B$) is the same as the maximum sintered build platform energy ($E_{Max}$). The plurality of bulk layers 220 are formed resulting in a top layer 222 of the sintered build platform 200. The uppermost initial layer 214 is the bottom layer of the bulk layers 220. Thus, the sintered build platform 200 includes a plurality of layers including the bottom layer (first initial layer 212) and the top layer 222. Each layer includes sintered particles, and the degree of sintering increases from the bottom layer (first initial layer 212) to the top layer 222. More specifically, in this embodiment, the degree of sintering progressively increases from the bottom layer (first initial layer 212) to an intermediate layer (the uppermost initial layer 214) and the degree of sintering is constant from the intermediate layer (the uppermost initial layer 214) to the top layer 222.

Also, as shown in FIG. 4, one or more parts 230 may be formed on top of the sintered build platform 200 and, more specifically, on top of the top layer 222. When the bulk layers 220 are omitted the uppermost initial layer 214 may be the top layer 222 on which the one or more parts 230 are formed. After the sintered build platform 200 is formed, the controller 180 lowers the worktable 124*a* predetermined distance, and the recoater 144 distributes a layer of the fusible powder 132 on top of the top layer 222 and the worktable 124. Then, the high-energy beam 152 is directed to irradiate the distributed layer of the fusible powder 132 in a control pattern (a third control pattern) to form the first layer of the part. The high-energy beam 152 may be directed to the distributed layer of the fusible powder 132 in an interlaced control pattern, similar to the patterns discussed above, but, in some instances, the high-energy beam 152 selectively irradiates the fusible powder 132 along the scan line to achieve the desired part 230 geometry. At least one scan of the scan line includes scanning the fusible powder 132 at a fusion energy level ($E_F$). The fusion energy level ($E_F$) is an energy level that increases the temperature of the fusible powder 132 under irradiation to a temperature greater than the melting temperature of the fusible powder 132 and is sufficient to impart enough heat to selectively melt the particles of the fusible powder 132.

The high-energy beam 152 may be directed to irradiate the distributed layer of fusible powder 132 multiple times for a scan line at different energy levels. For example, when the high-energy beam 152 is an electron beam, the high-energy beam 152 may be used to preheat the fusible powder 132 before it is melted, such as by irradiating the fusible powder 132 with at least one preheat scan at a preheat energy level. In some embodiments, two preheat scans may be used at a first preheat energy level and a second preheat energy level. The first preheat energy level and the second preheat energy level may be different from each other and both may be less than the fusion energy level ($E_F$). Using a preheat scan helps to avoid smoke during the fusion scan at the fusion energy level ($E_F$). As discussed above, the bulk energy level ($E_B$) and the maximum sintered build platform energy level ($E_{Max}$) may be the same or similar to the preheat energy level, such as the second preheat energy level.

Subsequent part layers are then formed by a similar process. After the first part layer is finished, the controller 180 lowers the worktable 124*a* predetermined distance, and the recoater 144 distributes a layer of the fusible powder 132 on top of the first part layer (the previous layer) and the worktable 124. Then the high-energy beam 152 is directed in a manner similar to the first part layer above to irradiate the distributed layer of the fusible powder 132 to form the second layer of the parts 230. This process is then repeated for each subsequent layer of the parts 230. For the second and other subsequent part layers, the fused portions of the subsequent layer may be bonded to fused portions of the preceding layer. The fused portions in the subsequent layer and the preceding layer may be melted together by melting, not only the fusible powder 132, but also remelting at least a fraction of a thickness of a layer directly below the fusible powder 132.

Once the parts 230 have been completed, the parts 230 and the sintered build platform 200 can be removed from the build chamber 110 and the parts 230 separated from the sintered build platform 200. With the sintered build platform 200 discussed herein, the parts 230 can be readily separated from the sintered build platform 200. Unlike the solid start plate 30 (FIG. 1), the sintered build platform 200 formed herein includes only sintered particles and thus the sintered build platform 200 can be readily recycled for subsequent use as the fusible powder 132.

The following tables provide an example of forming a sintered build platform 200 using the methods discussed herein. The sintered build platform 200 was formed using an electron beam powder bed fusion additive manufacturing machine 100 and, more specifically, EBM Q10+v2.1 produced by GE Additive, Mölnlycke, Sweden. The sintered build platform 200 was formed using Ti6Al4V (grade 5), having a particle side distribution from forty-five microns to one hundred six microns as the fusible powder 132.

The sintered build platform 200 was formed using the energy control approach shown in FIG. 6B using a plurality of sets for the initial layers 210. Seven sets of initial layers 210 are shown in Table 1, below. The maximum sintered build platform energy ($E_{Max}$) is layer set 7, and a plurality of bulk layers 220 was formed using the maximum sintered build platform energy ($E_{Max}$).

TABLE 1

| Layer Set | 1 | 2 | 3 | 4 | 5 | 6 | 7 |
|---|---|---|---|---|---|---|---|
| Beam Power (W) | $4.80 \times 10^2$ | $8.64 \times 10^2$ | $1.20 \times 10^3$ | $1.74 \times 10^3$ | $2.04 \times 10^3$ | $2.52 \times 10^3$ | $2.88 \times 10^3$ |
| Scan Speed (m/s) | 67 | 67 | 67 | 67 | 64 | 56 | 42 |
| Line Energy (J/m) | 7.16 | 12.9 | 17.9 | 26.0 | 31.9 | 45.0 | 68.6 |
| Spot Dia. (m) | $4.85 \times 10^{-4}$ | $5.66 \times 10^{-4}$ | $6.52 \times 10^{-4}$ | $7.56 \times 10^{-4}$ | $9.30 \times 10^{-4}$ | $1.17 \times 10^{-3}$ | $1.31 \times 10^{-3}$ |
| Local Heat Flux (W/m²) | $2.60 \times 10^9$ | $3.44 \times 10^9$ | $3.60 \times 10^9$ | $3.88 \times 10^9$ | $3.00 \times 10^9$ | $2.34 \times 10^9$ | $2.14 \times 10^9$ |
| Scanning Area (m²) | $4.41 \times 10^{-2}$ | $4.41 \times 10^{-2}$ | $4.41 \times 10^{-2}$ | $4.41 \times 10^{-2}$ | $4.41 \times 10^{-2}$ | $4.41 \times 10^{-2}$ | $4.41 \times 10^{-2}$ |

TABLE 1-continued

| Layer Set | 1 | 2 | 3 | 4 | 5 | 6 | 7 |
|---|---|---|---|---|---|---|---|
| Global Heat Flux (W/m$^2$) | $1.09 \times 10^4$ | $1.96 \times 10^4$ | $2.72 \times 10^4$ | $3.95 \times 10^4$ | $4.63 \times 10^4$ | $5.71 \times 10^4$ | $6.53 \times 10^4$ |
| Total Energy (J) | $4.21 \times 10^3$ | $7.58 \times 10^3$ | $1.05 \times 10^4$ | $1.53 \times 10^4$ | $1.64 \times 10^4$ | $1.98 \times 10^4$ | $2.52 \times 10^4$ |
| Step Height (m) | $1.00 \times 10^{-3}$ | $5.00 \times 10^{-4}$ | $5.00 \times 10^{-4}$ | $6.00 \times 10^{-4}$ | $7.00 \times 10^{-4}$ | $7.00 \times 10^{-4}$ | $6.70 \times 10^{-3}$ |
| Number of Repetitions | 8 | 8 | 8 | 8 | 7 | 6 | 5 |
| Line Spacing (m) | | | | $6.00 \times 10^{-4}$ | | | |
| Line Order | | | | 20 | | | |

Further aspects of the present disclosure are provided by the subject matter of the following clauses.

A method of forming a build platform for a powder bed fusion additive manufacturing process. The method comprises providing a bed of fusible powder on a worktable within a build chamber and directing a high-energy beam in a first control pattern to irradiate the bed of fusible powder and to form a first layer of the build platform. The high-energy beam being operated at a first energy level to form the first layer of the build platform. The method also includes forming subsequent initial layers of the build platform. Each subsequent layer is formed by lowering the worktable a predetermined distance, distributing a layer of the fusible powder on the worktable, and directing the high-energy beam to irradiate the distributed layer of the fusible powder in a second control pattern to form one of the subsequent initial layers of the build platform. The high-energy beam is operated at a second energy level that is increased from the first energy level for successive layers of the subsequent initial layers.

The method of the preceding clause, wherein, the step of providing the bed of fusible powder on the build platform within a build chamber, does not include providing a starting build plate.

The method of any preceding clause, further comprising controlling the energy level of the high-energy beam to progressively sinter the fusible powder to form a sintered build platform.

The method of any preceding clause, wherein the fusible powder is a fusible metal powder.

The method of any preceding clause, wherein the subsequent initial layers include a plurality of sets of subsequent initial layers, and wherein the energy level of the high-energy beam is incrementally increased for each successive set of the sets of subsequent initial layers.

The method of any preceding clause, wherein the fusible powder has a melting temperature, and wherein the energy level of the high-energy beam is increased incrementally from the first energy level to a maximum sintered build platform energy. The maximum sintered build platform energy is an energy level that maintains the fusible powder at a temperature less than the melting temperature of the fusible powder.

The method of any preceding clause, wherein the high-energy beam has a beam power and the energy level of the high-energy beam is controlled by controlling the beam power.

The method of any preceding clause, wherein directing the high-energy beam to form the first layer and the subsequent initial layers of the build platform includes scanning the high-energy beam at a scan speed and the energy level of the high-energy beam is controlled by controlling the scan speed.

The method of any preceding clause, wherein the high-energy beam has a spot diameter and the energy level of the high-energy beam is controlled by controlling the spot diameter of the high-energy beam.

The method of any preceding clause, wherein the energy level of the high-energy beam is controlled by controlling a line energy.

The method of the preceding clause, wherein the high-energy beam has a beam power, wherein directing the high-energy beam to form the first layer and the subsequent initial layers of the build platform includes scanning the high-energy beam at a scan speed, and wherein the line energy is a function of the beam power and the scan speed.

The method of any preceding clause, wherein the energy level of the high-energy beam is controlled by controlling a local heat flux of the high-energy beam.

The method of the preceding clause, wherein the high-energy beam has a beam power and a spot diameter, and the local heat flux is a function of the beam power and the spot diameter.

The method of any preceding clause, wherein the energy level of the high-energy beam is controlled by controlling a global heat flux of the high-energy beam.

The method of any preceding clause, wherein the energy level of the high-energy beam is controlled by controlling the total energy deposited on a layer.

The method of any preceding clause, wherein the energy level of the high-energy beam is controlled by controlling the number of repetitions.

The method of the preceding clause, wherein the high-energy beam has a beam power, wherein directing the high-energy beam to form the first layer and the subsequent initial layers of the build platform includes scanning the high-energy beam over a scanning area, and wherein the global heat flux is a function of the beam power and the scanning area.

The method of any preceding clause, wherein the energy level of the high-energy beam is controlled by controlling the number of repetitions.

The method of any preceding clause, wherein the energy level of the high-energy beam is controlled by controlling the beam power, the scan speed, the spot diameter of the high-energy beam, the scanning area, the number of repetitions, or any combination thereof.

The method of any preceding clause, wherein the energy level of the high-energy beam is controlled by controlling the line energy, the local heat flux, the global heat flux, or any combination thereof.

The method of any preceding clause, wherein the high-energy beam is an electron beam.

The method of any preceding clause, wherein the electron beam has a current, and the energy level of the high-energy beam is increased by increasing the current of the electron beam.

The method of any preceding clause, wherein the energy level of the high-energy beam is incrementally increased for each successive layer of the subsequent initial layers.

The method of any preceding clause, wherein the energy is increased linearly for each successive layer of the subsequent initial layers.

The method of any preceding clause, wherein the energy is increased at a constant energy increase rate for each successive layer of the subsequent initial layers.

The method of any preceding clause, wherein each of the first control pattern and the second control pattern include scanning the high-energy beam along a plurality of scan lines at a scanning speed, the scan lines being straight.

The method of any preceding clause, wherein each of the plurality of scan lines is parallel to each other.

The method of any preceding clause, wherein each of the plurality of scan lines is distributed evenly with a predefined line spacing.

The method of any preceding clause, further comprising forming bulk layers of the build platform, the bulk layers being formed after the subsequent initial layers. Each bulk layer is formed by lowering the worktable a predetermined distance, distributing a layer of the fusible powder on the worktable, and directing the high-energy beam at a bulk energy level to irradiate the distributed layer of the fusible powder in a second control pattern to form one of the bulk layers of the build platform.

The method of any preceding clause, wherein the fusible powder has a melting temperature, and the bulk energy level is an energy level that maintains the fusible powder at a temperature less than the melting temperature of the fusible powder.

The method of any preceding clause, wherein the energy level of the high-energy beam is incrementally increased from the first energy level to the bulk energy level for successive layers of the subsequent initial layers.

A method of forming a part using a powder bed fusion additive manufacturing process. The method comprises forming the build platform according to the method of any preceding clause, lowering the worktable including the build platform a predetermined distance, distributing a layer of the fusible powder on the worktable and the build platform, directing a high-energy beam at a fusion energy level to irradiate the distributed layer of the fusible powder in a third control pattern to form a first part layer of the part, and forming subsequent part layers. Each subsequent part layer is formed by lowering the worktable a predetermined distance, distributing a layer of the fusible powder on the worktable and the build platform, and directing the high-energy beam at the fusion energy level to irradiate the distributed layer of the fusible powder in a fourth control pattern to form one of the subsequent part layers of the part.

A method of forming a part of the preceding clause wherein the energy level of the high-energy beam is incrementally increased from the first energy level to an energy level less than the fusion energy level for successive layers of the subsequent initial layers.

The method of forming a part of any preceding clause, wherein the fusible powder has a melting temperature, the fusion energy level being an energy level that increases the temperature of the fusible powder under irradiation to a temperature greater than the melting temperature of the fusible powder.

The method of forming a part of any preceding clause, further comprising directing the high-energy beam at a preheat energy level to irradiate the distributed layer of the fusible powder in a fifth control pattern prior to directing the high-energy beam at the fusion energy level.

The method of forming a part of the preceding clause, wherein the energy level of the high-energy beam is increased incrementally from the first energy level to a maximum sintered build platform energy and the maximum sintered build platform energy is the same as the preheat energy level.

The method of forming a part of any preceding clause, further comprising removing the build platform and the part formed thereon from the build chamber, and separating the build platform from the part.

The method of forming a part of any preceding clause, further comprising recycling the build platform after separating the part from the build platform.

A sintered build platform for a powder bed fusion additive manufacturing process formed according to method of any preceding clause.

A sintered build platform for a powder bed fusion additive manufacturing process. The sintered build platform including a plurality of layers including a bottom layer and a top layer. Each layer includes sintered particles, and the degree of sintering increases from the bottom layer to the top layer.

The sintered build platform of any preceding clause, wherein the degree of sintering progressively increases for each successive layer.

The sintered build platform of any preceding clause, wherein the layers include a plurality of sets of layers. The degree of sintering being the same for each set and incrementally increases for each successive set of the sets of layers from the bottom layer to the top layer.

The sintered build platform of any preceding clause, further comprising a plurality of layers collectively forming initial layers and a plurality of layers collectively forming bulk layers.

The sintered build platform of any preceding clause, wherein each layer of the bulk layers has the same degree of sintering.

The sintered build platform of any preceding clause, wherein the degree of sintering progressively increases from the bottom layer to an intermediate layer, and the degree of sintering is constant from intermediate layer to the top layer.

The sintered build platform of the preceding clause, wherein a total thickness of the bulk layers is thicker than a total thickness of the initial layers.

A method of forming a part using a powder bed fusion additive manufacturing process. The method includes distributing a layer of fusible powder on the sintered build platform of any preceding cluse, directing a high-energy beam at a fusion energy level to irradiate the distributed layer of the fusible powder in a control pattern to form a first part layer of the part; and forming subsequent part layers. The sintered build platform is positioned on a worktable within a build chamber. Each subsequent part layer is formed by lowering the worktable a predetermined distance, distributing a layer of the fusible powder on the worktable and build platform, and directing the high-energy beam at the fusion energy level to irradiate the distributed layer of the fusible powder in a control pattern to form one of the subsequent part layers of the part.

The method of forming a part of the preceding clause, wherein the sintered build platform is formed using the method of forming the build platform of any preceding clause.

Although the foregoing description is directed to the preferred aspects, other variations and modifications will be apparent to those skilled in the art and may be made without departing from the spirit or the scope of the disclosure. Moreover, features described in connection with one aspect may be used in conjunction with other aspects, even if not explicitly stated above.

The invention claimed is:

1. A method of forming a build platform for a powder bed fusion additive manufacturing process, the method comprising:

providing a bed of fusible powder on a worktable within a build chamber;

directing a high-energy beam in a first control pattern to irradiate the bed of fusible powder and to form a first layer of the build platform, the high-energy beam being operated at a first energy level to form the first layer of the build platform; and forming subsequent initial layers of the build platform, each subsequent layer being formed by:

lowering the worktable a predetermined distance;

distributing a layer of the fusible powder on the worktable; and directing the high-energy beam to irradiate the distributed layer of the fusible powder in a second control pattern to form one of the subsequent initial layers of the build platform, wherein the high-energy beam is operated at a second energy level that is increased from the first energy level for successive layers of the subsequent initial layers.

2. The method of claim 1, further comprising controlling the energy level of the high-energy beam to progressively sinter the fusible powder to form a sintered build platform.

3. The method of claim 1, wherein the fusible powder is a fusible metal powder.

4. The method of claim 1, wherein the subsequent initial layers include a plurality of sets of subsequent initial layers, and wherein the energy level of the high-energy beam is incrementally increased for each successive set of the sets of subsequent initial layers.

5. The method of claim 1, wherein the fusible powder has a melting temperature, and wherein the energy level of the high-energy beam is increased incrementally from the first energy level to a maximum sintered build platform energy level, the maximum sintered build platform energy level being an energy level that maintains the fusible powder at a temperature less than the melting temperature of the fusible powder.

6. The method of claim 1, wherein the energy level of the high-energy beam is incrementally increased for each successive layer of the subsequent initial layers.

7. The method of claim 1, wherein the high-energy beam has a beam power and the energy level of the high-energy beam is controlled by controlling the beam power.

8. The method of claim 1, wherein directing the high-energy beam to form the first layer and the subsequent initial layers of the build platform includes scanning the high-energy beam at a scan speed and the energy level of the high-energy beam is controlled by controlling the scan speed.

9. The method of claim 1, wherein the high-energy beam has a spot diameter and the energy level of the high-energy beam is controlled by controlling the spot diameter of the high-energy beam.

10. The method of claim 1, wherein the energy level of the high-energy beam is controlled by controlling a number of repetitions.

11. The method of claim 1, wherein the energy level of the high-energy beam is controlled by controlling a line energy.

12. The method of claim 11, wherein the high-energy beam has a beam power, wherein directing the high-energy beam to form the first layer and the subsequent initial layers of the build platform includes scanning the high-energy beam at a scan speed, and wherein the line energy is a function of the beam power and the scan speed.

13. The method of claim 1, wherein the energy level of the high-energy beam is controlled by controlling a local heat flux of the high-energy beam.

14. The method of claim 13, wherein the high-energy beam has a beam power and a spot diameter, and the local heat flux is a function of the beam power and the spot diameter.

15. The method of claim 1, wherein the energy level of the high-energy beam is controlled by controlling a global heat flux of the high-energy beam.

16. The method of claim 15, wherein the high-energy beam has a beam power, wherein directing the high-energy beam to form the first layer and the subsequent initial layers of the build platform includes scanning the high-energy beam over a scanning area, and wherein the global heat flux is a function of the beam power and the scanning area.

17. The method of claim 1, further comprising forming bulk layers of the build platform, the bulk layers being formed after the subsequent initial layers, each bulk layer being formed by:

lowering the worktable a predetermined distance;

distributing a layer of the fusible powder on the worktable; and directing the high-energy beam at a bulk energy level to irradiate the distributed layer of the fusible powder in a second control pattern to form one of the bulk layers of the build platform.

18. The method of claim 17, wherein the fusible powder has a melting temperature, and the bulk energy level is an energy level that maintains the fusible powder at a temperature less than the melting temperature of the fusible powder.

19. A method of forming a part using a powder bed fusion additive manufacturing process, the method comprising:

forming the build platform according to the method of claim 1; and lowering the worktable including the build platform a predetermined distance;

distributing a layer of the fusible powder on the worktable and the build platform;

directing a high-energy beam at a fusion energy level to irradiate the distributed layer of the fusible powder in a third control pattern to form a first part layer of the part;

forming subsequent part layers, each subsequent part layer being formed by:

lowering the worktable a predetermined distance;

distributing a layer of the fusible powder on the worktable and the build platform; and directing the high-energy beam at the fusion energy level to irradiate the distributed layer of the fusible powder in a fourth control pattern to form one of the subsequent part layers of the part.

20. The method of claim 19, wherein the energy level of the high-energy beam is incrementally increased from the first energy level to an energy level less than the fusion energy level for successive layers of the subsequent initial layers.

* * * * *